(12) United States Patent
Robel et al.

(10) Patent No.: US 7,371,353 B2
(45) Date of Patent: May 13, 2008

(54) EXHAUST PURIFICATION WITH ON-BOARD AMMONIA PRODUCTION

(75) Inventors: Wade J. Robel, Peoria, IL (US); James Joshua Driscoll, Dunlap, IL (US); Gerald N. Coleman, Peterborough (GB)

(73) Assignee: Caterpillar Inc., Peoria, IL (US)

( * ) Notice: Subject to any disclaimer, the term of this patent is extended or adjusted under 35 U.S.C. 154(b) by 86 days.

(21) Appl. No.: 11/216,359

(22) Filed: Aug. 31, 2005

(65) Prior Publication Data

US 2007/0048195 A1    Mar. 1, 2007

(51) Int. Cl.
*B01D 50/00* (2006.01)
*F01N 3/00* (2006.01)

(52) U.S. Cl. .................. 422/180; 60/274; 60/285; 60/286

(58) Field of Classification Search ............ 422/177, 422/180; 60/274, 285, 286, 295, 297
See application file for complete search history.

(56) References Cited

U.S. PATENT DOCUMENTS

| | | |
|---|---|---|
| 5,714,130 A | 2/1998 | Saito et al. |
| 5,746,052 A | 5/1998 | Kinugasa et al. |
| 5,964,088 A | 10/1999 | Kinugasa et al. |
| 6,047,542 A | 4/2000 | Kinugasa et al. |
| 6,109,024 A | 8/2000 | Kinugasa et al. |
| 6,119,452 A | 9/2000 | Kinugasa et al. |
| 6,122,910 A | 9/2000 | Hoshi et al. |
| 6,128,898 A | 10/2000 | Sakurai et al. |
| 6,133,185 A | 10/2000 | Kinugasa et al. |
| 6,176,079 B1 | 1/2001 | Konrad et al. |
| 6,289,672 B1 | 9/2001 | Katoh et al. |
| 6,334,986 B2 | 1/2002 | Gieshoff et al. |
| 6,338,244 B1 | 1/2002 | Guenther et al. |
| 6,345,496 B1 | 2/2002 | Fuwa et al. |
| 6,662,552 B1 | 12/2003 | Gunther et al. |
| 6,732,507 B1 | 5/2004 | Stanglmaier |
| 6,739,125 B1 | 5/2004 | Mulligan |
| 6,871,489 B2 * | 3/2005 | Tumati et al. ............. 60/285 |
| 6,935,104 B2 * | 8/2005 | Kawatani et al. ........... 60/286 |
| 7,067,319 B2 * | 6/2006 | Wills et al. ................. 436/37 |
| 2004/0076565 A1 | 4/2004 | Gandhi et al. |

* cited by examiner

*Primary Examiner*—Glenn Caldarola
*Assistant Examiner*—Tom Duong
(74) *Attorney, Agent, or Firm*—Finnegan, Henderson, Farabow, Garrett & Dunner

(57) ABSTRACT

A system of ammonia production for a selective catalytic reduction system is provided. The system includes producing an exhaust gas stream within a cylinder group, wherein the first exhaust gas stream includes NOx. The exhaust gas stream may be supplied to an exhaust passage and cooled to a predetermined temperature range, and at least a portion of the NOx within the exhaust gas stream may be converted into ammonia.

5 Claims, 4 Drawing Sheets

US 7,371,353 B2

EXHAUST PURIFICATION WITH ON-BOARD AMMONIA PRODUCTION

U.S. GOVERNMENT RIGHTS

This invention was made with government support under the terms of Contract No. DE-FC05-00OR22806 awarded by the Department of Energy. The government may have certain rights in this invention.

TECHNICAL FIELD

This disclosure pertains generally to exhaust-gas purification systems for engines, and more particularly, to selective catalytic reduction systems with on-board ammonia production.

BACKGROUND

Selective catalytic reduction (SCR) provides a method for removing nitrogen oxides (NOx) emissions from fossil fuel powered systems for engines, factories, and power plants. During SCR, a catalyst facilitates a reaction between exhaust-gas ammonia and NOx to produce water and nitrogen gas, thereby removing NOx from the exhaust gas.

The ammonia that is used for the SCR system may be produced during the operation of the NOx-producing system or may be stored for injection when needed. Because of the high reactivity of ammonia, storage of ammonia can be hazardous. Further, on-board production of ammonia can be costly and may require specialized equipment.

One system for on-board ammonia production is disclosed in U.S. Pat. No. 5,964,088, issued to Kinugasa on Oct. 12, 1999 (hereinafter the '088 patent). The system of the '088 patent includes an engine having first and second cylinder groups being connected to first and second exhaust passages. The first exhaust passage includes an ammonia ($NH_3$) synthesizing catalyst, and the two exhaust passages are merged downstream at an interconnecting exhaust passage, which includes an exhaust purifying catalyst. An additional engine, which performs a rich operation, is provided, and the exhaust gas from the additional engine is fed to the first exhaust passage upstream of the ammonia synthesizing catalyst to make the exhaust gas air-fuel ratio of the exhaust gas flowing into the ammonia synthesizing catalyst rich to thereby synthesize ammonia.

While the method of the '088 patent may reduce NOx from an exhaust stream through use of on-board ammonia production, the method of the '088 patent has several drawbacks. For example, the method of the '088 patent may produce high-temperature exhaust gas and catalyst exotherms, which may heat the ammonia synthesizing catalyst. Excessive heating of the ammonia synthesizing catalyst may cause the ammonia synthesizing catalyst to function less efficiently. Further, the '088 patent does not provide a method for controlling the temperature of the ammonia synthesizing catalyst to provide efficient ammonia production.

The present disclosure is directed at overcoming one or more of the shortcomings of the prior art ammonia production systems.

SUMMARY OF THE INVENTION

A first aspect of the present disclosure includes a method of ammonia production for a selective catalytic reduction system. The method includes producing an exhaust gas stream within a cylinder group, wherein the exhaust gas stream includes NOx. The exhaust gas stream may be supplied to an exhaust passage and cooled to a predetermined temperature range. At least a portion of the NOx within the exhaust gas stream may be converted into ammonia.

A second aspect of the present disclosure includes a system for on-board ammonia production. The system may include a cylinder group configured to produce an exhaust gas stream which contains NOx and an exhaust passage fluidly connected with the cylinder group and configured to receive the exhaust gas stream. A cooler may be disposed downstream of the cylinder group and may be configured to cool the exhaust gas stream to a predetermined temperature range. A catalyst may be disposed downstream of the cooler and may be configured to convert at least a portion of the NOx in the exhaust gas stream into ammonia.

A third aspect of the present disclosure includes an exhaust gas emissions control system. The system may include a first cylinder group configured to produce a first exhaust gas stream, which contains NOx, and a first exhaust passage fluidly connected to the first cylinder group and configured to receive the first exhaust gas stream. A cooler may be disposed downstream of the first cylinder group and may be configured to cool the first exhaust gas stream to a predetermined temperature range. A first catalyst may be disposed downstream of the cooler and may be configured to convert at least a portion of the NOx in the exhaust gas stream into ammonia. The system may further include a second cylinder group configured to produce a second exhaust gas stream and a second exhaust passage configured to receive the second exhaust gas stream. A merged exhaust passage may be in fluid communication with the first exhaust passage and second exhaust passage. A third catalyst may be in fluid communication with the merged exhaust passage and configured to catalyze a reaction between NOx and ammonia.

BRIEF DESCRIPTION OF THE DRAWINGS

The accompanying drawings, which are incorporated in and constitute a part of this specification, illustrate exemplary embodiments of the disclosure and, together with the written description, serve to explain the principles of the disclosed system. In the drawings.

DETAILED DESCRIPTION

Figure 1:
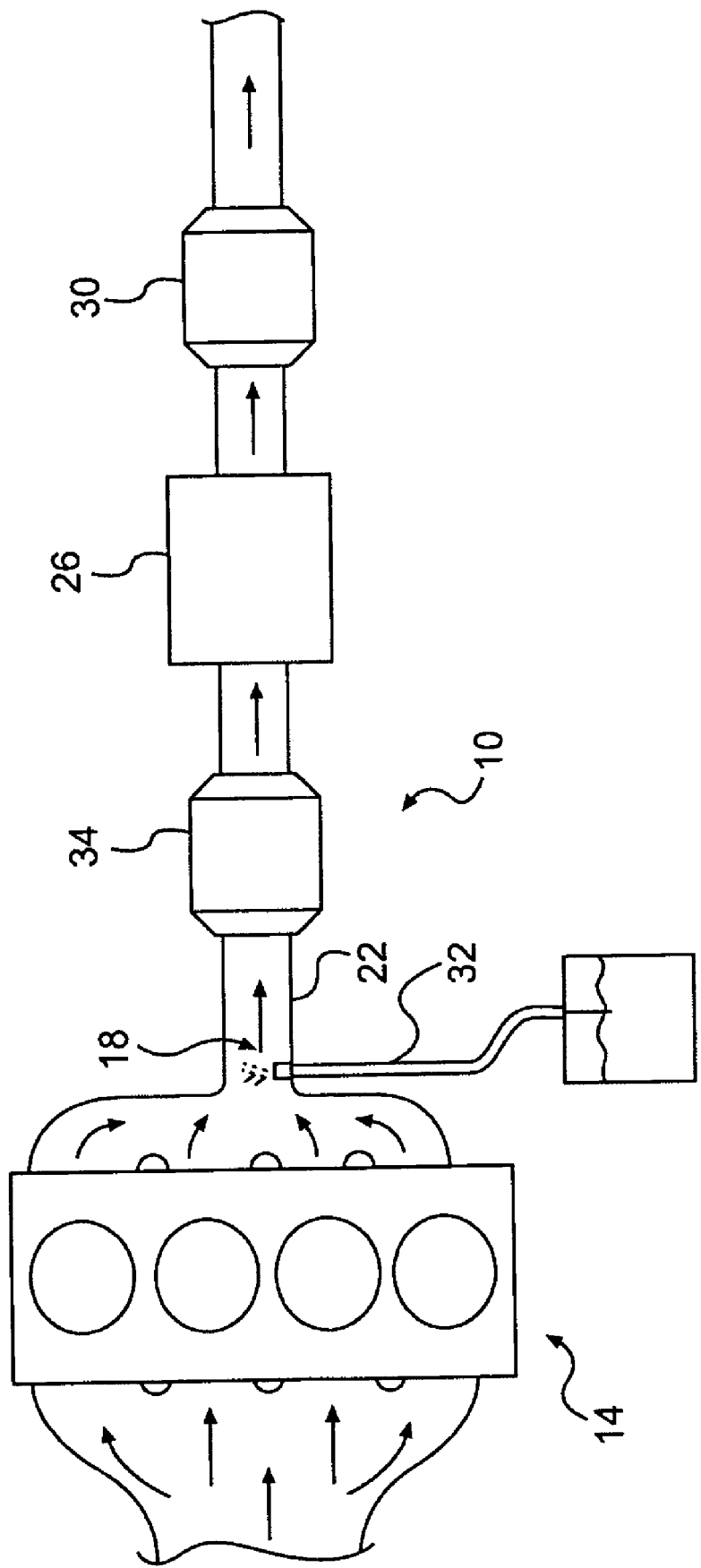
FIG. 1 illustrates an ammonia production system, according to an exemplary disclosed embodiment.

FIG. 1 illustrates an on-board ammonia production system 10, according to an exemplary disclosed embodiment. The ammonia production system 10 includes a cylinder group 14. Cylinder group 14 may be configured to produce an exhaust gas stream 18, which may contain NOx. Exhaust gas stream 18 may be supplied to an exhaust passage 22 and may be cooled by a cooling system 26. After being cooled, at least a portion of the NOx within exhaust gas stream 18 may be converted to ammonia by an ammonia-producing catalyst 30.

Figure 2:
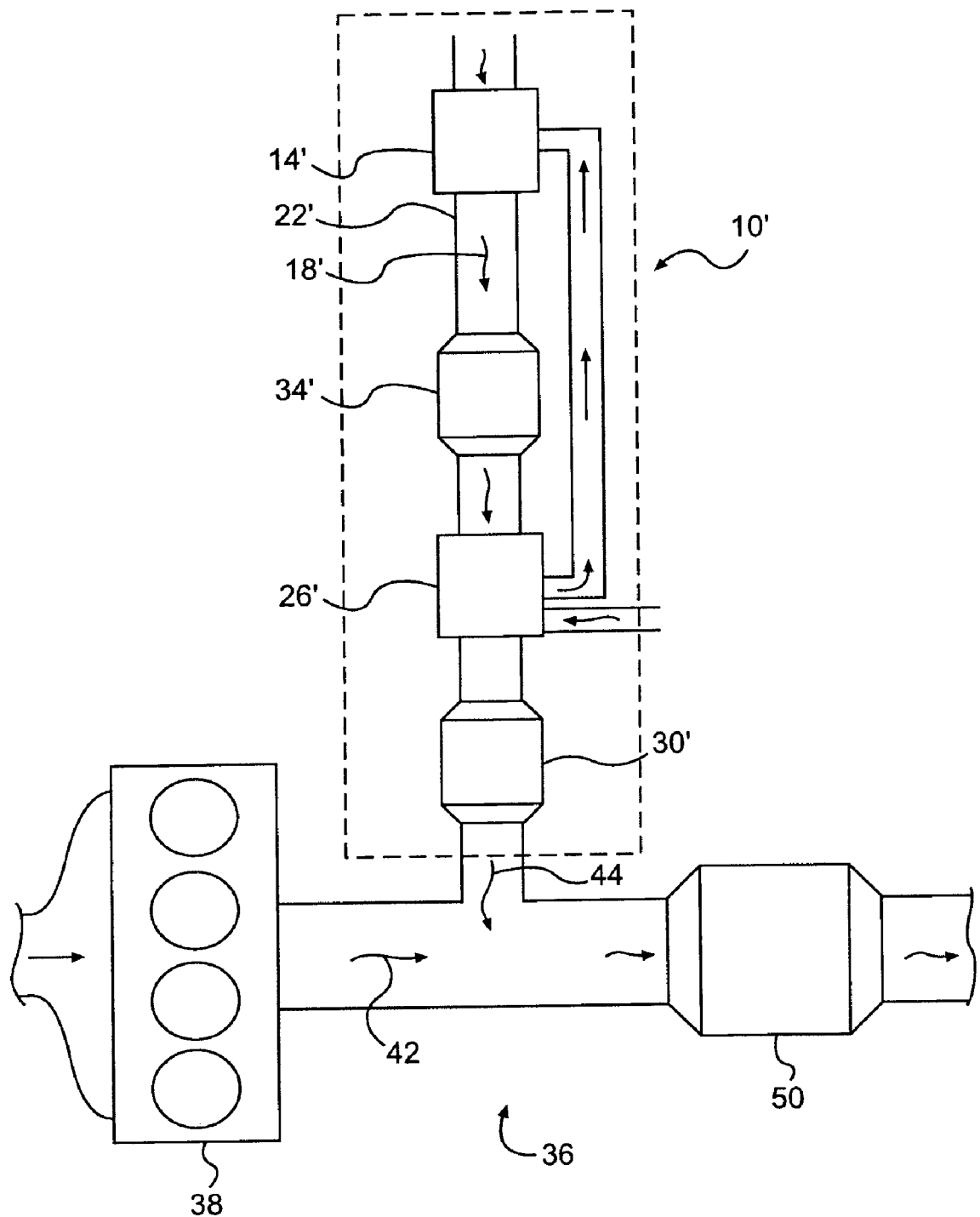
FIG. 2 illustrates an exhaust gas emissions control system including an ammonia production system, according to an exemplary disclosed embodiment.
Figure 3:
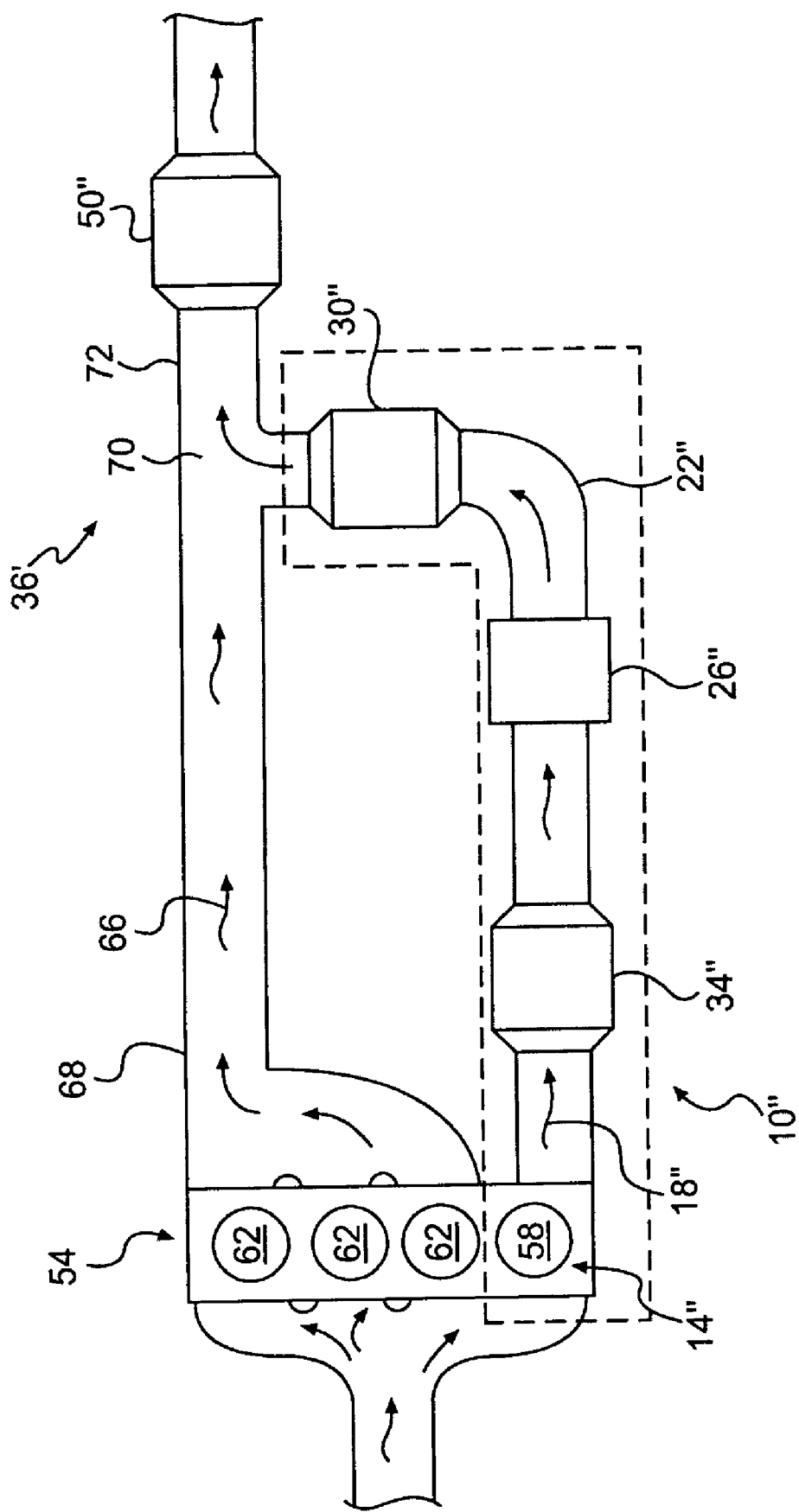
FIG. 3 illustrates another exhaust gas emissions control system including an ammonia production system, according to an exemplary disclosed embodiment.

The ammonia produced from NOx at ammonia-producing catalyst 30 may be used control NOx emissions using a selective catalytic reduction (SCR) system (as shown in FIGS. 2 and 3). SCR systems provide a method for decreasing exhaust gas NOx emissions by converting NOx to nitrogen, water, and/or other gases by catalytic reaction with ammonia. To improve the control of NOx emission using SCR systems, it may be desirable to control or optimize ammonia production by on-board ammonia production system 10. Ammonia production may be controlled by controlling the amount of NOx produced by cylinder group 14 and/or by controlling the efficiency of NOx-to-ammonia conversion at ammonia-producing catalyst 30.

A variety of suitable cylinder group configurations may be selected for cylinder group 14. For example, cylinder group 14 may include a range of cylinder numbers and/or sizes. In addition, the operational parameters of cylinder group 14 may be selected to produce a certain amount of NOx and/or other chemical species. The specific cylinder group size, number, and/or operational parameters may be selected based on cost, fuel-efficiency, desired amount of NOx and/or ammonia production, space considerations, and/or any other suitable factor.

As shown in FIG. 1, cylinder group 14 includes a four cylinder engine. However, cylinder group 14 may include an engine with any suitable number of cylinders. For example, suitable engines may include, one cylinder, two cylinders, three cylinders, four cylinders, or eight or more cylinders. Further, in other embodiments, cylinder group 14 may include one or more cylinders of a single engine having multiple cylinder groups, wherein one or more cylinders of the engine are included in the cylinder group of ammonia production system 10 and the other cylinders of the engine are not configured for use with ammonia production system 10 (as shown in FIG. 3).

In addition, a range of operational parameters may be selected for cylinder group 14. For example, a variety of different temperatures, compression ratios, air-to-fuel ratios, combustion strategies, and/or fuel additives may be used to control NOx production within one or more cylinders of cylinder group 14.

The operation of engine cylinders may be dependant on the ratio of air-to-fuel vapor that is injected into the cylinders during operation. The air-to-fuel vapor ratio is often expressed as a lambda value, which is derived from the stoichiometric air-to-fuel vapor ratio. The stoichiometric air-to-fuel vapor ratio is the chemically correct ratio for combustion to take place. A stoichiometric air-to-fuel vapor ratio may be considered to be equivalent to a lambda value of 1.0.

Engine cylinders may operate at non-stoichiometric air-to-fuel vapor ratios. An engine cylinder with a lower air-to-fuel vapor ratio has a lambda less than 1.0 and is said to be rich. An engine cylinder with a higher air-to-fuel vapor ratio has a lambda greater than 1.0 and is said to be lean.

Lambda may affect cylinder NOx production and fuel efficiency. A lean-operating cylinder may have improved fuel efficiency compared to a cylinder operating under stoichiometric or rich conditions. Further, lean operation may increase NOx production. However, lean operation may also decrease the efficiency of NOx-to-ammonia conversion at ammonia-producing catalyst 30.

In some embodiments, cylinder group 14 may have a lean air-to-fuel ratio within the one or more cylinders of cylinder group 14. The specific lambda may be selected based on a desired amount of NOx production, desired fuel efficiency, or for any other suitable factor. In some embodiments, the air-to-fuel ration may be between about 1.0 and about 1.3, between about 1.0 and about 1.2, or between about 1.0 and about 1.1.

To improve NOx-to-ammonia conversion at ammonia-producing catalyst 30, it may be desirable to enrich exhaust gas stream 18 after combustion within cylinder group 14. For example, in some embodiments, an additive supply device 32 may be configured to supply fuel, reductants, and/or other additives to exhaust gas stream 18. Additive supply device 32 may include a variety of suitable additive supply devices, including any suitable fuel injector. Further, additive supply device 32 may be configured to produce an exhaust gas stream 18 having a certain lambda. For example, in some embodiments, additive supply device 32 may be configured to produce an exhaust gas stream 18 having a lambda between about 0.8 and about 1.0, between about 0.8 and about 0.9, between about 0.8 and about 0.85, or between about 0.85 and about 0.95.

In other embodiments, cylinder group 14 may be made rich within the cylinders. For example, in some embodiments, cylinder group 14 may include a combustion strategy whereby combustion occurs at a lean air-to-fuel ratio and late injection makes the cylinder rich within the cylinder. Alternatively, combustion may occur under rich conditions to facilitate production of desired exhaust gas concentrations or to control power output.

Ammonia-producing catalyst 30 may be selected from a number of suitable catalyst types. For example, ammonia-producing catalyst 30 may be made from a variety of materials. In one embodiment, ammonia-producing catalyst 30 may include at least one of platinum, palladium, rhodium, iridium, copper, chrome, vanadium, titanium, iron, or cesium. Combinations of these materials may be used, and the catalyst material may be chosen based on cost, the type of fuel used, the air-to-fuel vapor ratio desired, or for conformity with environmental standards. The specific type of catalyst may also be selected to control ammonia-to-NOx conversion efficiency. Further, the catalyst may be selected based on the amount of NOx produced by cylinder group 14 and/or the catalyst temperature under selected operating conditions.

Catalyst operation may be affected by a variety of different factors. For example, catalyst operation may be affected by the presence of other chemicals in the surrounding exhaust gas, by catalyst temperature, and/or by contamination with exhaust gas chemicals. In some embodiments of the present disclosure, the temperature of ammonia-producing catalyst 30 may be controlled by cooling exhaust gas stream 18 using cooling system 26. In addition, the presence of other chemical species in exhaust gas stream 18 may be controlled by controlling the operation of cylinder group 14, through the use of additive supply device 32, or through the use of one or more additional catalysts 34 located upstream of ammonia-producing catalyst 30.

Cooling system 26 can include a variety of different cooling system types. For example, suitable cooling systems can include forced-induction systems, air-to-gas coolers, water-to-gas coolers, or any other suitable cooler type. Cooling system 26 may be selected based on a number of different factors. For example, suitable cooling systems 26 may be selected based on desired amount of cooling, cooling system cost, size, compatibility with other components, ability of the cooling system materials to withstand exhaust gas temperatures, or based on any other suitable factor.

In some embodiments, cooling system 26 may include a forced-induction system such as a turbocharger, a turbocompounding system or a supercharger. Forced-induction systems may be configured to increase air intake by cylinder group 14, while also lowering the temperature of exhaust gas stream 18. Further, forced induction systems may be configured to regulate power output and/or NOx production by cylinder group 14. For example, forced-induction systems may facilitate control of the air-to-fuel ratio within cylinder group 14 to control NOx production. In addition, turbochargers may be configured to return energy to cylinder group 14, thereby providing more efficient operation under some conditions.

In some embodiments, it may be desirable to maintain the temperature of exhaust gas stream 18 and/or ammonia-producing catalyst 30 within a certain range by cooling the exhaust gas stream 18 with cooling system 26. Suitable temperature ranges may vary based on a number of factors, including the operating parameters of cylinder group 14, NOx levels, exhaust gas composition, and/or the selected catalyst type. In some embodiments, exhaust gas stream 18 may be cooled to a temperature between about 350° C. and about 550° C., between about 400° C. and about 600° C., between about 450° C. and about 650° C., between about 450° C. and about 500° C., or between about 450° C. and about 550° C. Further, the temperature of exhaust gas stream 18 may be cooled to produce a bed temperature in ammonia-producing catalyst 30 between about 600° C. and about 700° C., between about 600° C. and about 750° C., between about 625° C. and about 675° C., or between about 650° C. and about 700° C.

The temperature of exhaust gas stream 18 and catalyst 30 may be selected to facilitate conversion of NOx to ammonia at catalyst 30. In some embodiments, stream 18 may be cooled to a temperature selected to convert a certain fraction or percentage of the NOx to ammonia. For example, the temperature may be selected to maintain a conversion efficiency of NO to ammonia of at least about 50%, at least about 75%, at least about 80%, or at least about 90%.

It should be noted that some catalysts will be subject to exotherms, thereby causing the temperature of the catalyst material to increase during use. For example, in some embodiments, the temperature of exhaust gas stream 18 at the inlet of catalyst 30 may be between about 100° C. and about 200° C. cooler than the catalyst bed temperature. Therefore, in some embodiments, the amount of cooling of exhaust gas 18 may be selected based on the type of catalyst material or degree of heating at catalyst 30 due to exotherms.

In some embodiments, ammonia production system 10 may include one or more additional catalysts 34 disposed upstream of ammonia-producing catalyst 30. A variety of suitable catalysts 34 may be selected and multiple catalysts may be used. For example, suitable catalysts may be configured to control exhaust gas concentrations of a variety of chemicals including, for example, hydrocarbons, oxygen, carbon monoxide, and/or any other suitable exhaust gas chemical. In addition, catalysts 34 positioned upstream of ammonia-producing catalyst 30 may further cool exhaust gas stream 18, thereby protecting ammonia-producing catalyst 30 from high temperatures and facilitating ammonia production by decreasing the temperature of ammonia-producing catalyst 30. In addition, catalysts 34 positioned upstream of ammonia-producing catalyst 30 may change the exhaust gas stream composition, thereby removing chemical species, which may potentially cause high-temperature exotherms at ammonia-producing catalyst 30.

In some embodiments, one or more additional upstream catalysts 34 may be selected to produce exhaust gas concentrations that may improve NOx-to-ammonia conversion by ammonia-producing catalyst 26. For example, certain exhaust gas chemicals, including some hydrocarbons and oxygen may cause NOx-to-ammonia conversion at ammonia-producing catalyst 30 to be less efficient. In addition, hydrocarbons and/or oxygen may cause a certain amount of NOx to be converted into nitrogen gas at ammonia-producing catalyst, thereby decreasing the amount of ammonia produced. Further, other exhaust gas chemicals may improve the conversion of NOx to ammonia at ammonia-producing catalyst 30. For example, hydrogen gas, carbon monoxide and/or propene may facilitate catalytic reduction of NOx, thereby improving ammonia production at ammonia-producing catalyst 30.

To produce efficient ammonia production from NOx, catalysts 34 may be selected to increase concentrations of certain exhaust gas chemicals, such as hydrogen, while decreasing the concentration of hydrocarbons and oxygen. In some embodiments, catalyst 34 may be configured to oxidize hydrocarbons, thereby reducing the concentration of hydrocarbons and oxygen, and increasing the concentration of hydrogen within exhaust gas stream 18.

As shown in FIG. 1, catalyst 34 is disposed upstream of ammonia-producing catalyst 30 and upstream of cooling system 26. However, in some embodiments, catalyst 34 may be positioned upstream of ammonia-producing catalyst and downstream of cooling system 26. Further, in other embodiments, multiple catalysts may be used and catalysts may be positioned both upstream and downstream of cooling system 26.

As shown in FIG. 1, cylinder group 14 includes a four cylinder engine. In some embodiments, cylinder group 14 may serve as a source of NOx for ammonia production while also serving as a power source for trucks or other work machines. In addition, cylinder group 14 may serve as power source for certain work machine components, thereby providing power to certain work machine systems such as alternators, pumps, hydraulic systems, or any other suitable component.

In some embodiments, ammonia production system 10 may provide a source of ammonia for selective catalytic reduction systems. For example, FIG. 2 illustrates an exhaust gas emissions control system 36, according to an exemplary embodiment. The system includes an ammonia production system 10', which includes an engine comprising first cylinder group 14'. System 36 further includes a second engine 38, which may produce a second NOx-containing exhaust gas stream 42. Exhaust gas stream 42 may be merged with an ammonia containing exhaust gas stream 44 produced by ammonia production system 10'. The merged exhaust gas stream will then pass through an SCR catalyst 50 disposed downstream of both engine 38 and ammonia production system 10'.

Ammonia production system 10' is similar to the ammonia production system 10 shown in FIG. 1. Ammonia production system 10' includes a cylinder group 14', which supplies a NOx-containing exhaust gas stream 18' to an exhaust passage 22'. Ammonia production system 10' further includes a cooling system 26', an ammonia-producing catalyst 30', and an upstream catalyst 34'. As shown in FIG. 2, cooling system 26' is a turbocharger, which may be configured to increase air intake by cylinder group 14'. However, as noted previous, cooling system 26' may include any suitable cooling system type.

The two engines 38 and 14' may provide power to a work machine, such as a truck. Further, engines 38 and 14' may have different sizes, shapes, operating parameters, and/or functions within a work machine. For example, engine 38 may include a diesel engine, which may serve as the main power source for a truck or other work machine. Engine 14' may be smaller than engine 38 and may be configured to produce NOx for ammonia production system 10'. In other embodiments, engine 14' may produce NOx for ammonia production system 10', while also providing a secondary power source for certain machine components.

In some embodiments, a single engine may serve as both a NOx source for ammonia production and as a primary work machine power source. FIG. 3 illustrates an exhaust gas emissions control system 36", according to another exemplary embodiment. System 36" of FIG. 3 includes a single engine 54, which may include a first cylinder group 14" and a second cylinder group 62. First cylinder group 14" may produce a first exhaust gas stream 18", which may be used to produce ammonia by an ammonia production system 10". Second cylinder group 62 may produce most of the engine power for a work machine, such as a truck, and will produce a second NOx-containing exhaust gas stream 66.

As noted, first cylinder group 14" and second cylinder group 62 may be located on a single engine 54. As shown, first cylinder group 14" includes a single cylinder 58, and second cylinder group 62 includes three cylinders. However, first and second cylinder group 14", 62 may include any suitable number of cylinders.

First cylinder group 14" and second cylinder group 62 may have separate air-intake and exhaust passages. For example, first cylinder group 14" and second cylinder group 62 may have separate exhaust passages 22", 68. Exhaust passage 22" of first cylinder group 14" may provide a NOx-containing exhaust gas stream to ammonia production system 10". Exhaust passage 68 of second cylinder group 62 may receive exhaust gas stream 66 of all the cylinders of second cylinder group 62. In addition, as shown, first and second cylinder groups 14", 62 have a common air-intake passage. In other embodiments, first and second cylinder groups 14", 62 may have separate air-intake passages.

In addition, first cylinder group 14" and second cylinder group 62 may have different operational characteristics. For example, first cylinder group 14" may have different air-to-fuel ratios, may employ a different combustion strategy, may include an exhaust gas additive supply device (as shown in FIG. 1), may have different compression ratios, may have different cylinder sizes, may include a different number of cylinders, and/or may operate at different temperatures than second cylinder group 62. In some embodiments, first cylinder group 14" may be configured to maximize NOx production for a given quantity of fuel used, thereby increasing ammonia production by ammonia production system 10".

In some embodiments, the operational characteristics of second cylinder group 62 may be selected based on desired function. For example, the operational parameters of second cylinder group 62 may be selected to produce a certain power output for operation of a machine. In addition, second cylinder group 62 may burn more fuel than first cylinder group 14", and therefore, second cylinder group may be configured to maintain a certain level of fuel efficiency or to maintain certain emissions standards.

As noted, first cylinder group 14" may produce an exhaust gas stream 18" to be used by an ammonia production system 10". Ammonia production system 10" may be similar to ammonia production systems 10, 10' described previously and may include a cooling system 26", an ammonia-producing catalyst 30", and one or more upstream catalysts 34".

In addition, the ammonia produced by ammonia production system 10" may be used to control NOx emissions contained in exhaust gas stream 66 produced by second cylinder group 62. As shown, exhaust gas stream 66 produced by second cylinder group 62 may be merged with an ammonia containing exhaust gas stream 70 from ammonia production system 10" within a merged exhaust passage 72. Merged exhaust passages may be fluidly connected with exhaust passages 22", 68 of both first cylinder group 14" and second cylinder group 66. An SCR catalyst 50'may be configured to catalyze a reaction between ammonia from exhaust gas stream 70 and NOx from second exhaust gas stream 66.

EXAMPLE

Control of NOx to Ammonia Conversion Efficiency

The efficiency of NOx-to-ammonia conversion at different temperatures was demonstrated using a bench-top testing system. The system included an ammonia-producing catalyst configured to receive an exhaust gas stream from an experimental exhaust gas generation system. In this case, a three-way catalyst produced by Umicore was used to produce ammonia from exhaust gas NOx.

The experimental exhaust gas generation system included a series of gas tanks, which contained various exhaust gas chemical species, including NOx, hydrocarbons, carbon monoxide, and oxygen. The gas tanks supplied combinations of the chemical species to a cylindrical tube, which was fluidly connected with the downstream three-way catalyst. The exhaust gas temperature was controlled by heating the experimentally generated exhaust gas stream within the cylindrical tube. A series of heating elements were configured to heat the exhaust gas to the desired temperature range.

Figure 4:
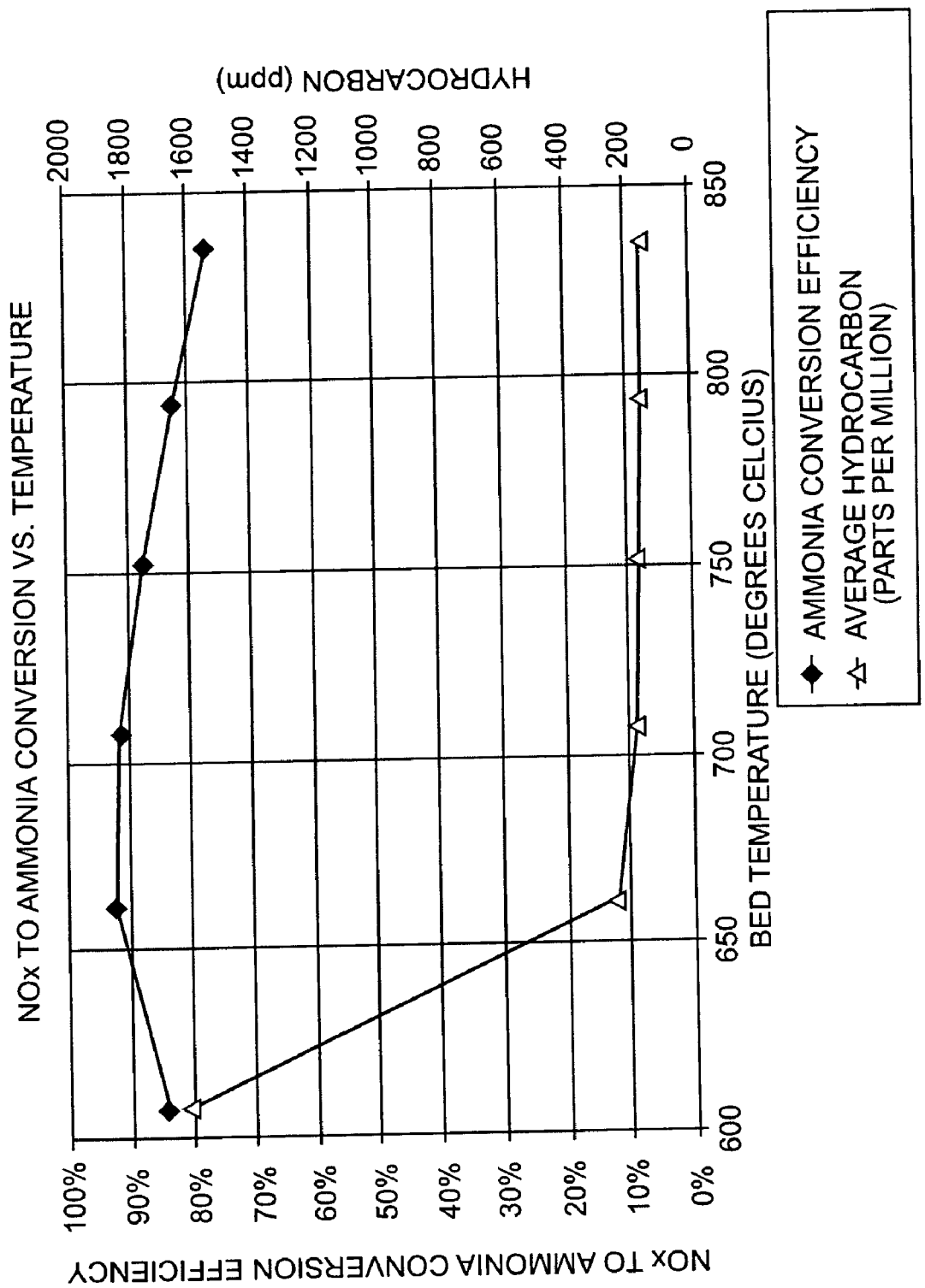
FIG. 4 illustrates the relationship between exhaust gas temperature and efficiency of ammonia production in an experimental ammonia production system.

FIG. 4 illustrates the correlation between ammonia conversion efficiency and temperature. The temperature indicated in FIG. 4 represents the exhaust gas temperature at the catalyst inlet. The catalyst bed temperature may be about 100° C. to about 150° C. higher than the gas stream temperature due to exotherms. As shown, ammonia conversion efficiency reached a maximum of about 93% at about 660° C. Ammonia conversion efficiency decreased as the exhaust gas temperature increased. It should be noted that this ammonia conversion efficiency occurred under controlled conditions, and the ammonia conversion efficiency may be higher or lower, depending on the fuel used, the specific combustion strategy, the catalyst systems used, and a variety of other factors.

Ammonia conversion efficiency may also be related to the concentration of other exhaust gas chemicals. For example, FIG. 4 shows the concentration of hydrocarbons, as produced experimentally using a mixture of propane and propene. Hydrocarbon concentrations may increase at lower temperatures due to hydrocarbon slip for some engine and exhaust systems. Therefore, in the present experiment, hydrocarbon concentrations were increased at lower temperatures to mimic typical hydrocarbon temperature for engines.

As shown in FIG. 4, increased hydrocarbons at lower temperatures decreased the efficiency of NOx-to-ammonia conversion. It should be noted that other exhaust gas chemical species may also affect NOx-to-ammonia conversion. These chemicals may include, for example, oxygen, carbon monoxide, and/or other hydrocarbons. Further, different catalyst formulations may produce higher or lower ammonia conversion efficiencies.

INDUSTRIAL APPLICABILITY

The present disclosure provides an exhaust-gas emissions control system including an on-board ammonia production system. This system may be useful in all engine types that produce NOx emissions.

On-board ammonia production can provide an efficient method for reducing NOx emissions using selective catalytic reduction systems. However, the efficacy, efficiency, and cost-effectiveness of on-board ammonia production may require improved methods for controlling the production of ammonia from exhaust gas NOx. The present disclosure provides a system and method for controlling the temperature of ammonia-producing catalysts used in on-board ammonia production systems. Temperature control of ammonia-producing catalysts can provide increased efficiency of conversion of NOx to ammonia. This increased efficiency may allow more ammonia to be produced when needed, thereby providing improved control of NOx emissions by selective catalytic reduction systems.

Temperature control of ammonia-producing catalysts may be accomplished using a variety of different cooling systems. For example, any suitable air-to-gas or water-to-gas cooler may be used. In addition, a forced induction system, such as a turbo charger, may be used as a cooler. Turbochargers will allow suitable temperature control, while also improving engine power output and/or fuel efficiency.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. An exhaust gas emission control system, comprising:
   a first cylinder group configured to produce a first exhaust gas stream which contains NOx;
   a first exhaust passage fluidly connected with the first cylinder group and configured to receive the first exhaust gas stream;
   a cooler disposed downstream of the first cylinder group and configured to cool the first exhaust gas stream to a predetermined temperature range;
   a first catalyst disposed downstream of the cooler and configured to convert at least a portion of the NOx in the exhaust gas stream into ammonia;
   a second cylinder group configured to produce a second exhaust gas stream;
   a second exhaust passage configured to receive the second exhaust gas stream;
   a merged exhaust passage in fluid communication with the first exhaust passage and second exhaust passage; and
   a second catalyst in fluid communication with the merged exhaust passage and configured to catalyze a reaction between NOx and ammonia.

2. The system of claim 1, wherein the cooler includes a turbocharger.

3. The system of claim 1, wherein the cooler is selected from an air-to-gas cooler and a water-to-gas cooler.

4. The system of claim 1, wherein the first cylinder group includes a first engine and the second cylinder group includes a second engine.

5. The system of claim 1, wherein the first cylinder group and the second cylinder group are included on a single engine.

* * * * *